United States Patent [19]

Moffitt et al.

[11] Patent Number: 5,197,347
[45] Date of Patent: Mar. 30, 1993

[54] HAND AND FOOT CONTROL SYSTEM FOR AN OFF-HIGHWAY IMPLEMENT

[75] Inventors: John M. Moffitt; Marvin L. Morris; David E. Johnson, all of Wichita, Kans.

[73] Assignee: Case Corporation, Racine, Wis.

[21] Appl. No.: 822,068

[22] Filed: Jan. 17, 1992

[51] Int. Cl.$^5$ .................. G05G 1/24; G05G 11/00
[52] U.S. Cl. ................... 74/481; 74/471 R; 74/523; 74/531; 74/850
[58] Field of Search ............ 74/471 R, 474, 481, 74/482, 491, 523, 531, 850; 192/0.098

[56] References Cited

U.S. PATENT DOCUMENTS

| | | | |
|---|---|---|---|
| 1,701,906 | 2/1929 | Bailhe | 74/501.6 X |
| 2,552,001 | 5/1951 | Dugas | 192/0.098 |
| 2,588,650 | 3/1952 | Morse | 192/0.098 |
| 2,847,872 | 8/1958 | Todd | 74/481 X |
| 3,902,575 | 9/1975 | Nelson et al. | 74/531 X |
| 4,721,004 | 1/1988 | Ward | 74/476 |
| 4,750,596 | 6/1988 | Grunberg et al. | 74/531 X |
| 4,811,620 | 3/1989 | Old et al. | 74/474 |
| 4,875,384 | 10/1989 | Hirayama et al. | 74/471 R X |

*Primary Examiner*—Allan D. Herrmann
*Attorney, Agent, or Firm*—Dressler, Goldsmith, Shore, Sutker & Milnamow, Ltd.

[57] ABSTRACT

A control system including interfaced hand and foot control assemblies for independently conditioning an off-highway implement by selectively positioning a regulator thereof relative a neutral position. The hand and foot control assemblies utilize a common force transfer mechanism in the form of a push/pull cable for moving and positioning the regulator. The foot control assembly includes a self-centered foot pedal and linkages for arranging the push/pull cable relative to the regulator in a manner inhibiting binding forces from being imparted to the cable. The hand control assembly requires independent movement of a control lever in two different planes to shift the hand control assembly from a neutral condition. Moreover, the hand control assembly is isolated from spring forces acting to self center the foot pedal and thus requires low operator efforts to adjust the position of the regulator. The control system of the present invention further includes a mechanism for governing operation of the regulator. A neutral switch assembly is preferably arranged in combination with the hand control assembly for controlling auxiliary functions on the implement.

16 Claims, 5 Drawing Sheets

FIG. 1

HAND AND FOOT CONTROL SYSTEM FOR AN OFF-HIGHWAY IMPLEMENT

FIELD OF THE INVENTION

The present invention generally relates to a control system for an off-highway implement and, more particularly, to a control system having hand and foot controls which allow an operator to adjust a regulator whose position conditions both ground speed and direction for the implement by either hand or foot.

BACKGROUND OF THE INVENTION

Off-highway equipment such as trenchers and the like commonly use both hand and foot controls for adjusting a regulator of a prime mover. The hand control offers metered ground speed control during a work mode for the implement. The foot control is typically used during a transportation mode for the implement.

The regulator on such an implement typically includes a pivotal lever connected to a servovalve of a hydrostatic pump. Movement of the regulator lever in one direction from a neutral position conditions the speed and forward direction of the implement. Movement of the regulator lever in an opposite direction from a neutral position conditions speed and reverse direction for the implement.

The foot control of known control systems includes a self-centered foot pedal which is connected through a linkage assembly to the regulator. Pivotal movement of the foot pedal to opposite sides of a neutral position changes the position of the regulator and thereby conditions the implement as a function of the resultant regulator position. The foot pedal is normally maintained in a center or neutral position under the influence of a centering spring. As will be appreciated, using a spring influenced foot pedal to maintain a substantially constant speed for the implement over an extended time period can be a tedious process.

In view of the above, some implements have been known to use a hand control for conditioning the implement to operate in a substantially constant condition. With these known systems, the hand control is connected to the regulator through the same linkage assembly used by the foot control. Adjustment of the hand control, however, requires an operator to overcome the forces of the self-centering spring used to return the foot pedal to a neutral condition.

Connecting the hand control and foot control through the same linkage assembly has presented several drawbacks during operation of the implement. First, using a common linkage assembly for the hand and foot controls makes it difficult for the operator to achieve accurate metered control of the regulator through use of the hand control. Overcoming the spring forces acting to return the foot pedal to a neutral position requires considerable effort on the part of the operator thereby frustrating accurate metered operation of the regulator. Second, use of a common linkage assembly causes the foot pedal to move conjointly with the hand control. Thus, the foot pedal is prevented from automatically returning to its neutral position upon adjustment of the hand control. As will be appreciated, the cumulative movement of the regulator under the influence of the foot and the hand controls further needs to be governed to inhibit damage to the hydrostatic pump connected to and which operates in response to the position of the regulator.

SUMMARY OF THE INVENTION

In view of the above, and in accordance with the present invention, there is provided an off-highway implement with a control system for setting the ground speed and direction of the implement. The control system includes interfaced hand and foot control assemblies for independently moving a regulator through a range of positions thereby selectively regulating operation of a hydrostatic pump and thereby controlling implement operation. Unlike known control systems which use a linkage mechanism, the hand and foot control assemblies of the present invention utilize a common force transfer mechanism in the form of a push-/pull cable for selectively moving and positioning the regulator.

While connected and responsive to both the hand and foot control assemblies, the foot control assembly arranges the push/pull cable to inhibit cable binding stresses from being imparted to the cable as the regulator is moved through its full range of positions. Moreover, the foot control includes a self-centered foot pedal connected to the push/pull cable. Notably, operation of the hand control assembly is isolated from the foot pedal so as to make the hand control "operator friendly" in that only low efforts or forces are required to position the regulator lever under the influence of the hand control assembly.

The push/pull cable includes an elongated flexible conduit having first and second ends and a flexible core element. The first end of the conduit is secured against movement. The ends of the flexible core element extend beyond the ends of the conduit. A first end of the core element is secured to a hand-operated control of the hand control assembly. The second end of the core element is connected to the pump regulator. Pivotal movement of the hand control or foot pedal translates into movement of the pump regulator.

The foot pedal of the foot control assembly is connected toward a second end of the flexible conduit. The push/pull cable acts as a solid link connection between the location where the foot pedal is connected thereto and the regulator such that pivotal movement of the foot pedal causes movement of the regulator independent of the hand control assembly. The foot control assembly further includes a linkage assembly for supporting and positioning the second end of the flexible conduit relative to the regulator through the full range of regulator positions thereby inhibiting cable binding stresses from being imparted to the push/pull cable as the regulator moves in opposite directions away from a neutral position.

The linkage assembly of the foot control assembly preferably includes a self-centering lever connected to the foot pedal and to a cable mounting plate. The mounting plate is attached and supports a second end of the push/pull cable. In the preferred form of the invention, the cable mounting plate is supported for swinging movement by a parallel linkage mechanism which allows movement of the mounting plate in an elliptical arc and in a manner inhibiting cable binding stresses in the push/pull cable for all settings of the regulator.

The hand control of the hand control assembly preferably includes a pivotal hand controller or lever mounted by a housing and connected to the push/pull cable such that the position of the regulator is adjusted in response to pivotal movement of the hand lever about a first axis. The hand lever of the hand control assembly is likewise movable about a second pivot axis extending generally normal to the first axis. The housing of the hand control assembly preferably has a profiled guide adapted to engage a portion of the hand lever and requires movement of the hand lever about each of the pivot axes to move the regulator lever from a neutral position to either a first or a second operational position.

In a preferred form of the invention, the profiled guide on the housing defines a neutral recess which removably accommodates a portion of the hand control lever and further defines first and second limit stops arranged on opposite sides of the neutral recess. The limit stops regulate movement of the hand control about the first axis. Moreover, the hand control assembly may further include a brake for inhibiting inadvertent rotation of the hand control lever about the first axis in response to vibrational feedback within the push/pull cable resulting from implement operation.

The control system of the present invention can further include governing means for limiting movement of the regulator beyond a predetermined range of movement. In a most preferred form of the invention, the governing means includes a fixed member defining an elongated slot through which a pivotal lever of the regulator extends. Opposite ends of the slot limit movement of the regulator lever in opposite directions thereby inhibiting movement of the regulator beyond a predetermined range of movement.

Moreover, the control system of the present invention can include a mechanism for inhibiting starting of the implement under certain conditions. Such mechanism preferably includes a neutral switch assembly which is responsive to movement of the regulator and which prevents starting of the implement unless the hand and foot control assemblies are each in a neutral position.

The dual interfaced controls offered by the control system of the present invention allows the operator the convenience to control operation of the implement through use of a hand control during a work mode while allowing independent control of the implement through use of the foot control when transportation of the implement from one location to the other is required. Although interrelated with each other, the control assemblies are independently operated from each other such that the operator can set the hand control assembly to condition the implement at a substantially continuous ground speed and thereafter use the foot control assembly to override the ground speed and direction set by the hand control assembly. Upon release of the foot pedal, however, the regulator is returned to that position set by the hand control assembly and the implement continues to operate in that selected condition.

An important feature of the present invention being that the hand control assembly is operable in combination with but is likewise isolated from the foot control assembly. Thus, the spring forces used to return the foot pedal to a neutral position do not affect the hand control lever. The independency of the two control systems readily allows the hand control lever to be selectively and ergonomically moved to position the regulator lever and thereby condition the implement for operation.

Moreover, the foot control assembly is connected to and supports the push/pull cable with a cable mounting plate. The cable mounting plate is arranged to swing forward and rearward in an elliptical path controlled by a parallel linkage. The controlled path keeps the cable in alignment with and for all positions of the regulator lever thereby eliminating any cable binding stresses caused by misalignment of the cable relative to the regulator lever.

The control system of the present invention furthermore limits the travel of the regulator. When the combined action of the hand and foot control assemblies urges the regulator beyond its predetermined range of travel, the governing means eliminates stresses to the servovalve for the hydrostatic pump which could result from overextension of the regulator. Forced movement of the foot control assembly following the regulator reaching a limit of its travel, causes the push/pull cable to forcibly return the hand control lever to a neutral position thus compensating for the continued displacement of the foot control assembly.

Another important aspect of the present invention concerns the design of the hand control assembly. The hand control assembly was designed such that the operator could not inadvertently move the hand control lever from a neutral position and propel the implement. Moreover, the hand control assembly can include one or more separate switch assemblies for controlling auxiliary functions on the implement. The control handle for the hand control assembly is releasably locked in the recess groove thereby maintaining a neutral condition for the hand control assembly. The control handle can easily be rotated out of the recess groove such that it can be pushed forward or rearward to move the regulator and propel the implement forward or reverse. The hand control further includes limit stops for limiting the travel of the control handle thereby limiting movement of the implement.

These and other features of the present invention will become readily apparent from the following detailed description, the accompanying drawings, and the appended claims.

DETAILED DESCRIPTION OF THE PRESENT INVENTION

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Figure 1:
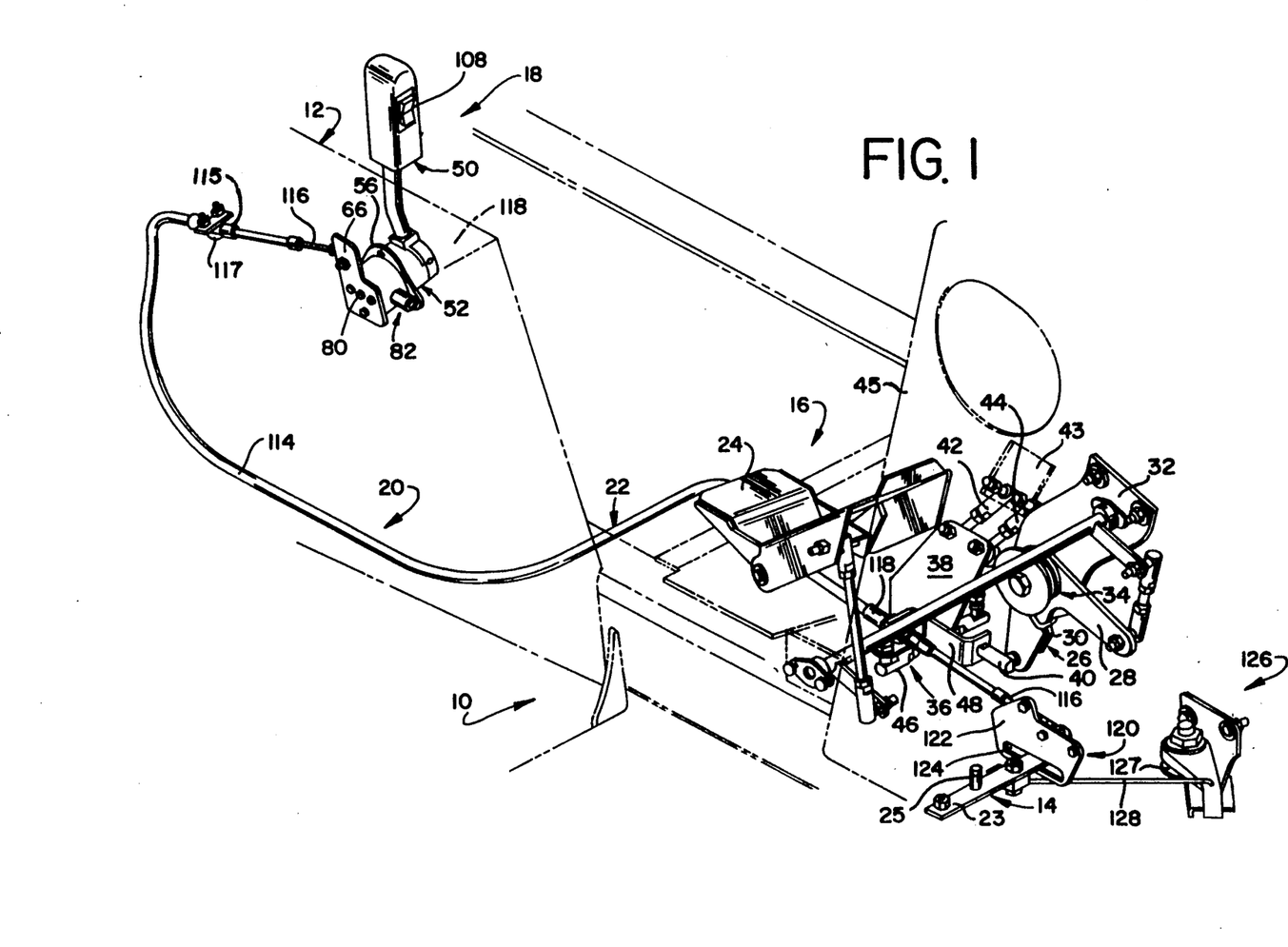
FIG. 1 is a diagrammatic perspective view of a control system including hand and foot control assemblies for conditioning an implement by positioning a ground speed and direction regulator on the implement.

Referring now to the drawings, wherein like reference numerals indicate like parts throughout the views, there is shown in FIG. 1 a control system 10 for a mobile off-highway implement 12 such as a trencher machine or the like. The control system 10 of the present invention includes a movable regulator 14, a foot control assembly 16 for moving and positioning the regulator 14 during a transportation mode of implement operation, and a hand control assembly 18 for moving and positioning the regulator 14 during a work or operational mode of implement operation. The foot and hand control assemblies 16 and 18, respectively, are both connected to the regulator 14 through a common force transfer mechanism 20 in the form of a push/pull cable 22.

In the illustrated embodiment, the regulator 14 includes an elongated regulator lever or member 23 movable through a range of travel from a center neutral position in first and second opposite directions to condition the ground speed and direction for the implement. In a preferred form of the invention, the regulator lever 23 is connected to and supported by a shaft 25 depending from a conventional servovalve (not shown) on the implement which controls operation of a conventional hydrostatic pump (not shown). The output of the pump typically influences ground speed as well as forward and reverse operation of the implement.

Figure 2:
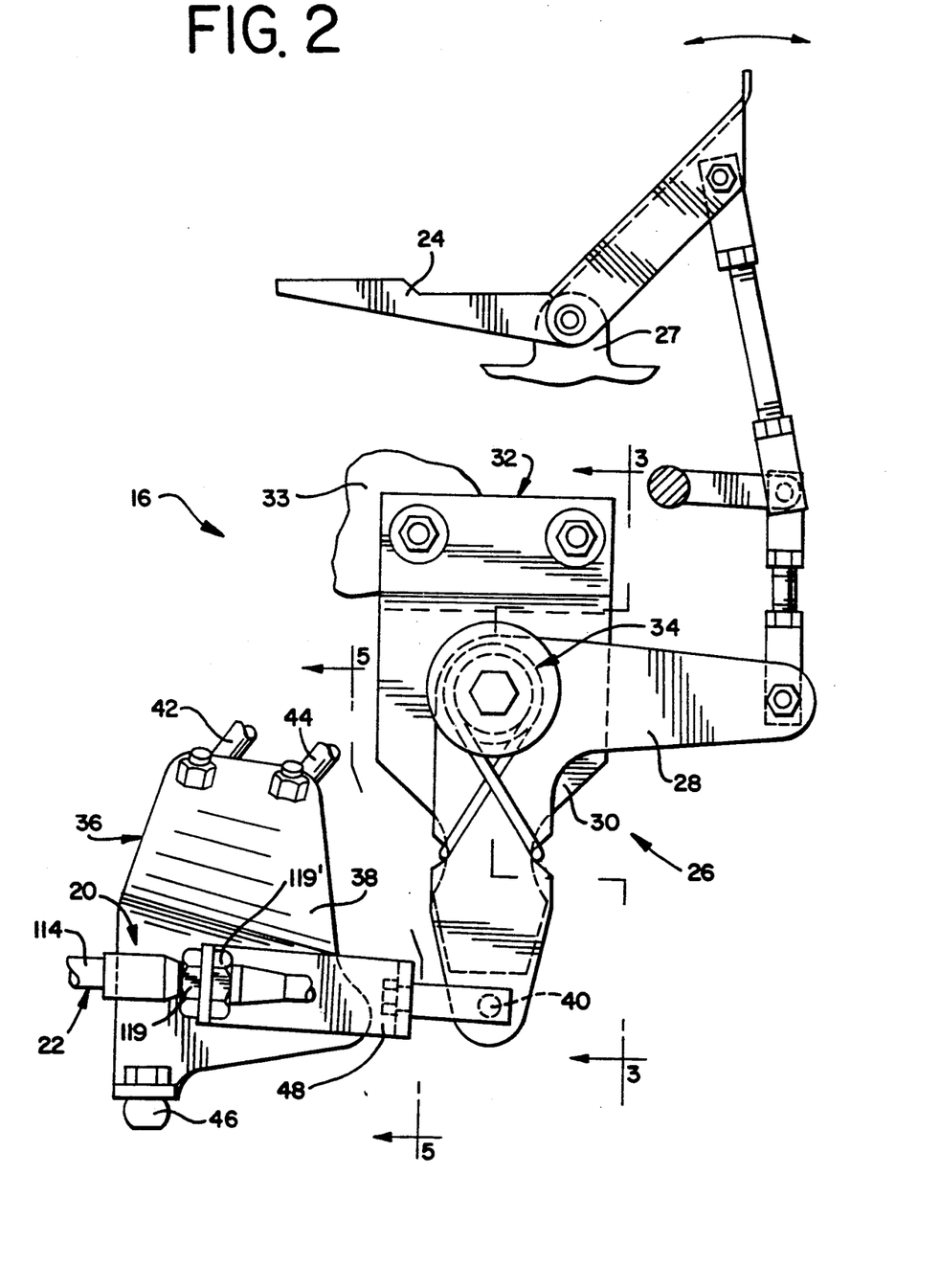
FIG. 2 is a side-elevational view of the foot control assembly forming part of the control system.

The foot control assembly 16 includes a self-centering foot pedal 24 which is connected to a linkage assembly 26 and through the force transmitting mechanism 20 to the regulator 14. As shown in FIG. 2, the foot pedal 24 is pivotally movable in first and second directions and is mounted on the implement floor, a fragmentary part of which is shown at 27. Rocking movement of the foot pedal 24 from a neutral position causes the implement to move in forward and reverse directions.

Figures 3, 6:
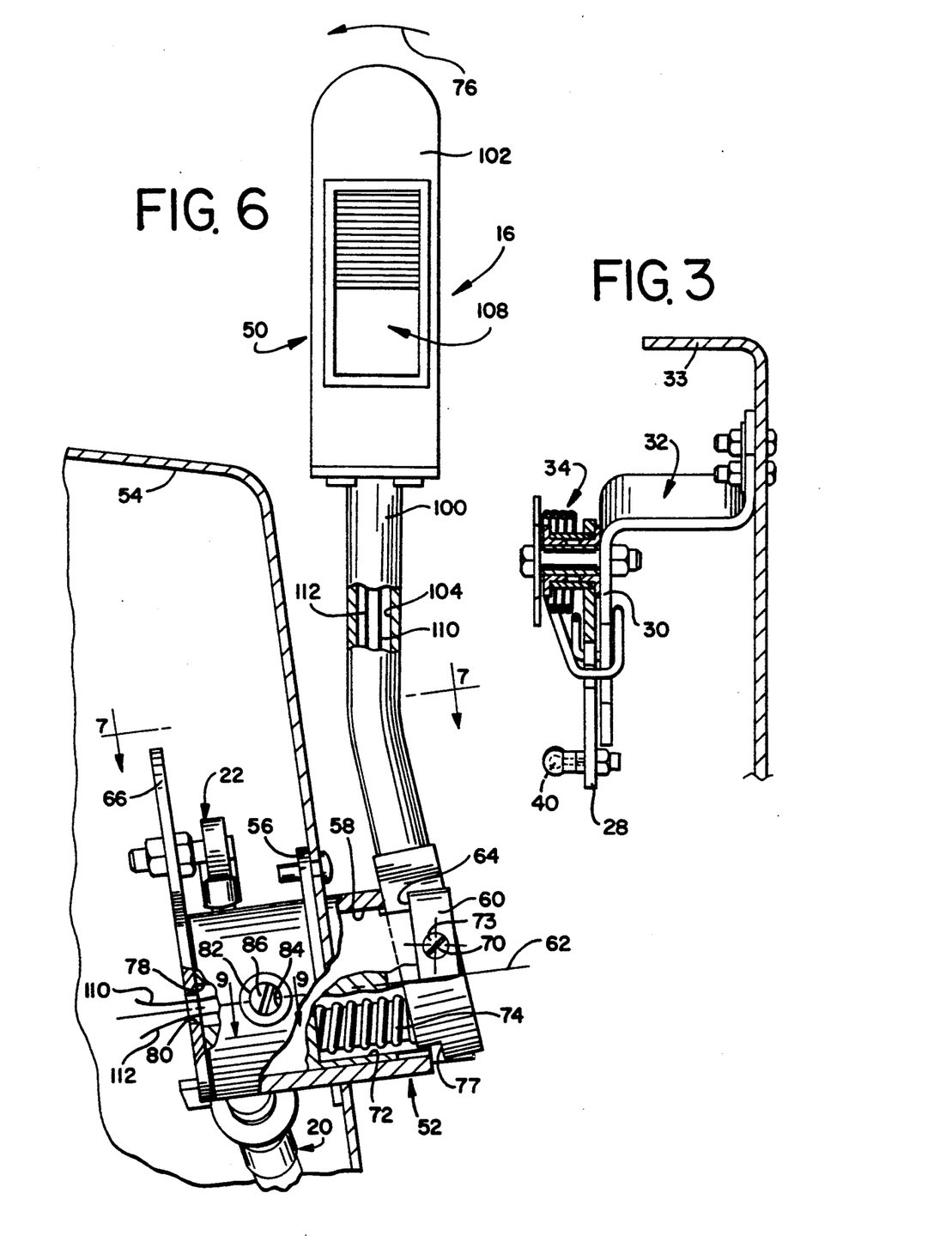
FIG. 3 is an elevational view partially shown in section, and taken along line 3—3 of FIG. 2.
FIG. 6 is an enlarged elevational view, partly broken away, of the hand control assembly forming part of the control system of the present invention.

As shown in FIGS. 2 and 3, linkage assembly 26 transmute rocking movement of foot pedal 24 into linear movement of the push/pull cable 22. The linkage assembly 26 preferably includes a bellcrank lever 28 pivotally carried by a depending leg 30 of a mounting bracket 32 fixed to a panel or wall 33 of the implement. A bellcrank centering spring 34 is arranged in combination with the bellcrank lever 28 and bracket 32. As will be appreciated, spring 34 has sufficient force such that it will forcibly and automatically return the foot pedal 24 to a neutral or center position after the forces acting on the pedal 24 have been removed therefrom.

Figures 4, 5:
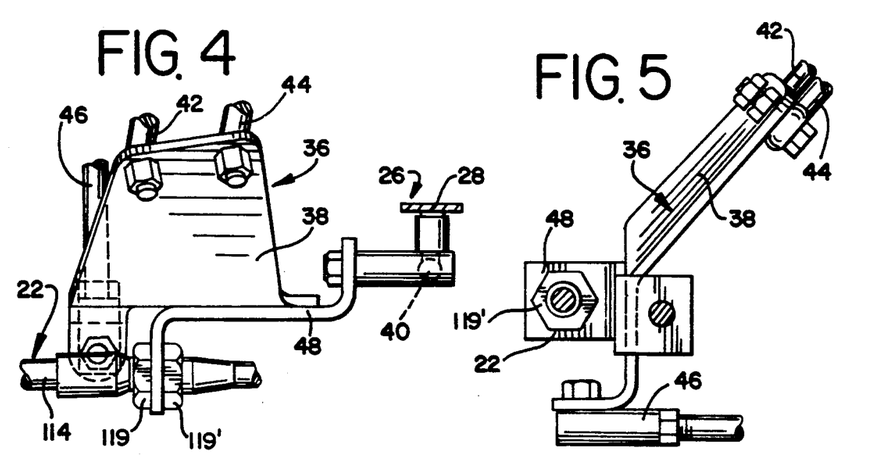
FIG. 4 is a top plan view of a portion of the foot control assembly as illustrated in FIG. 2.
FIG. 5 is an elevational view taken along line 5—5 of FIG. 2.

Linkage assembly 26 further includes a cable mounting assembly 36 for supporting and positioning an end of the push/pull cable 22 relative to the regulator 14 for all settings or positions of the regulator lever 23 thereby inhibiting cable binding stresses from being imparted to the force transmitting mechanism 20 as the regulator 14 is moved throughout its range of motion in first and second opposite directions from a neutral position. As shown in FIGS. 2, 4 and 5, the cable mounting assembly 36 includes a cable mounting plate 38 which is connected to lever 28 of the linkage assembly 26. Preferably, a ball joint type connector 40 is used to connect plate 38 to lever 28 to inhibit binding forces therebetween. Notably, the mounting plate 38 is mounted for suspended motion at the ends of a series of links 42, 44 and 46. The opposite ends of links 42 and 44 are articulately connected to a suitable bracket 43 or the like provided on a wall 45 (FIG. 1) of the implement. An opposite end of link 46 is similarly connected for articulating movement to wall 45 (FIG. 1) of the implement. Links 42 and 44 are substantially equal in length and combined to form a parallelogram type linkage mechanism. Links 42, 44 when combined with link 46 allow plate 38 to swingably move in an elliptical arc. A cable mounting bracket 48 is fixedly secured to plate 38 and supports one end of the push/pull cable 22 while allowing cable 22 to extend therebeyond.

Figure 7:
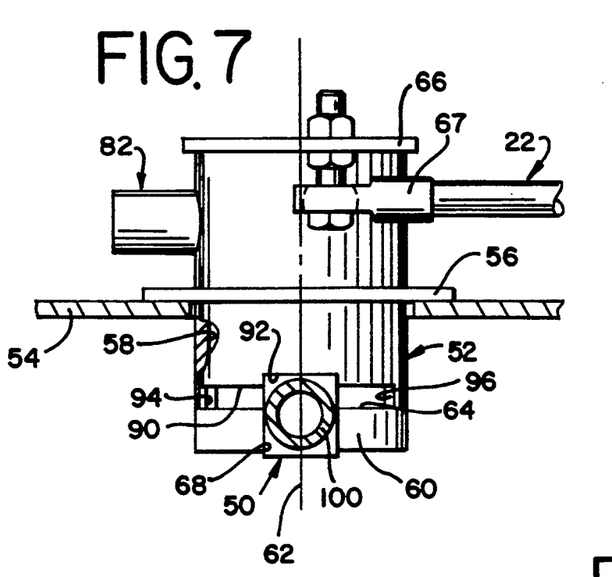
FIG. 7 is a top plan view taken along line 7—7 of FIG. 6.

The hand control assembly 18 likewise utilizes the push/pull cable 22 to selectively move the regulator 14 in first and second directions thereby conditioning the implement for operation. As illustrated in FIG. 6, the hand control assembly 16 preferably includes a control lever or handle 50 which is connected to the cable 22 and is pivotally carried by a housing 52 mounted on a panel 54 of the implement such that the lever 50 is readily accessible to the operator. As shown in FIGS. 6 and 7, housing 52 preferably includes a mounting flange 56 to facilitate mounting of the housing 52 to panel 54 and defines a central bore 58 extending therethrough. A shouldered shaft 60 is accommodated for rotation within the bore 58 and defines a first axis of rotation 62 for allowing the hand control lever 50 to be rocked in a fore-and-aft direction. A shoulder 64 on shaft 60 abuts against one end of housing 52. A cable mounting link 66 fastened to the opposite end of shaft 60 prevents endwise movement of shaft 60 within the housing 52 while allowing for free rotational movement relative thereto. As shown, cable 22 is affixed to the upper end of link 66 as by a conventional ball joint 67.

Figure 8:
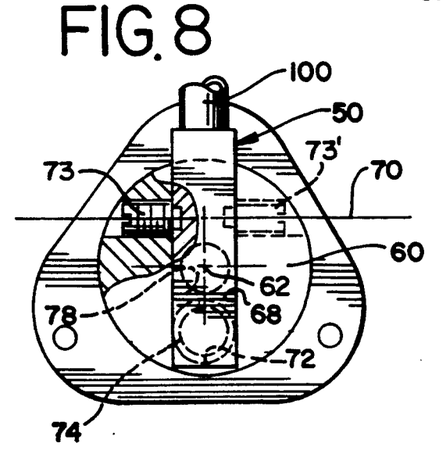
FIG. 8 is a side elevational view, partially in section, of a lower end of the hand control assembly illustrated in FIG. 6.

As shown in FIGS. 7 and 8, shaft 60 includes a vertically elongated slot 68 which accommodates a lower end of the hand control lever 50 for sidewise pivotal movement about a second axis 70. Preferably, the second axis 70 which allows sidewise pivotal movement of the hand control lever 50 is arranged above the axis 62 of shaft 60 and extends generally normal thereto.

As shown in FIG. 8, an identical pair of axially aligned and shouldered fasteners 73 and 73' threadably engage with shaft 60. The fasteners 73, 73' extend inwardly toward and the shouldered end of each fastener 73, 73' engages a respective side of control level 50. The axial alignment of fasteners 73, 73' defines the second axis 70 about which lever 50 rotates.

As shown in FIGS. 6 and 8, in a most preferred form of the present invention, shaft 60 further defines a blind bore 72 which opens to the vertically elongated slot 68. A spring 74, captively arranged within bore 72, normally urges handle 50 in the direction of arrow 76 (FIG. 6) and about axis 70.

Returning to FIG. 6, engagement between the control handle 50 and housing 52 limits rotation of the handle 50 in the direction of arrow 76. In the preferred embodiment, a lower end of handle 50 is configured with a shoulder 77. Shoulder 77 on control handle 50 is adapted to engage housing 52 and limit rotation of the control handle in a direction opposite to that indicated by arrow 76.

For purposes to be described in detail hereinafter, shaft 60 further defines an elongated bore 78 which extends lengthwise therethrough and opens to the slot 68 at one end of shaft 60 and opens to an aligned hole 80 defined by link 66 at the opposite end of shaft 60. Preferably, bore 78 and aligned hole 80 are defined on shaft 60 and link 66, respectively, in relatively close relation to the rotational axis 62 of shaft 60.

Figure 9:
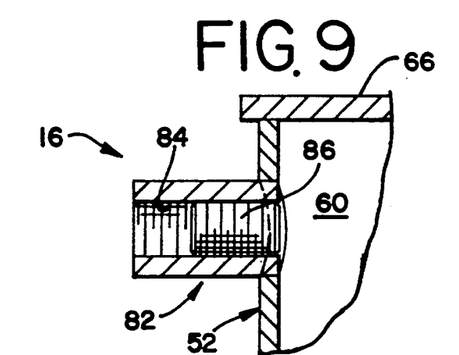
FIG. 9 is a sectional view taken along line 9—9 of FIG. 6.

Turning to FIG. 9, the hand control assembly 18 can further include a brake 82 for inhibiting inadvertent rotation of shaft 60 within housing 52 in response to vibrational feedback through the push/pull cable 22. As shown, housing 52 preferably includes an internally threaded bore 84 extending radially from the shaft 60 and which accommodates an externally threaded member 86. The inner end of member 86 is adapted to frictionally engage shaft 60 and inhibit its free and inadvertent rotation within the housing 52. In a most preferred form of the invention, the threaded member 86 is fabricated from a nylon-like material thereby enhancing its frictional engagement with shaft 60. As will be appreciated, a non-metal or nylon-like insert could likewise be inserted between member 86 and shaft 60 to provide a braking force for inhibiting inadvertent rotation of shaft 60 relative to housing 52.

Returning to FIG. 7, at that end proximate to handle 50, housing 52 is provided with a profiled guide 90 which is engagable with hand control lever 50. Moreover, the configuration of guide 90 requires the lever 50 to be moved about each of the pivot axes 62 and 70 before the hand control mechanism 18 can be used to adjust the regulator 14 from a neutral position to either first or second operational positions. As shown, the profiled guide 90 on housing 52 defines a neutral recess 92 which releasably accommodates a portion of the hand control lever 50 therein. As will be appreciated, the lever 50 is normally urged into the recess 92 under the influence of spring 74 (FIG. 6). The profiled guide 90 further defines first and second stops 94 and 96 arranged respectively on opposite of the neutral recess 92 for limiting pivotal movement of the hand control lever 50 about axis 62 and thereby regulating movement of the hand control mechanism 16.

In the preferred form of the invention, and as shown in FIG. 6, the control lever 50 for the hand control assembly 18 includes a vertical lever portion 100 with a grip portion 102 fastened to an upper end thereof. Lever portion 100 defines an internal passage 104 opening to the grip portion 102 and extending for the majority of the length of lever portion 100 toward its lower end. Passage 104 opens to the elongated bore 78 in shaft 60. The grip portion 102 has ergonomically secured thereto a selectively operable electric switch assembly 108 for controlling auxiliary functions i.e., a two-speed ground drive, on the implement. Lead wires 110, 112 pass internally from the switch assembly 108, downwardly through passage 104, and outwardly through the elongated bore 78 and hole 80 in link 66 for connection to the electrical system of the implement. As will appreciated, locating bore 78 and hole 80 proximate to the rotational axis 62 of shaft 60 reduces movement of the wires 110, 112 upon rocking movement of the hand control lever 50.

The push/pull cable 22 of the force transfer mechanism 20 includes an elongated flexible outer conduit 114 and a flexible motion transmitting core element 116. As shown in FIG. 1, one end 115 of the outer conduit 114 proximate to the hand control assembly 18 is suitably secured to the implement thereby preventing end 115 of conduit 114 from moving. In the illustrated embodiment, a U-bolt 117 secures end 115 of the conduit 114 to a wall portion 118 of the implement.

As shown in FIGS. 2 and 4, a second or opposite end 118 of the outer conduit 114 is supported and connected to the cable mounting assembly 36. More specifically, the outer flexible conduit 114 of cable 22 is connected by a pair of bulk head threaded fasteners 119 and 119' arranged on opposite sides of the cable mounting bracket 48. The core element 116, however, is movably supported by and has its opposite ends extending beyond the ends of conduit 114. One end of the core element 116 is connected to link 66 of the hand control assembly 18 while the opposite end of the core element 116 is connected to the lever 23 of the regulator 14. By such construction, fore-and-aft pivotal movement of the control lever 50 of the hand control assembly 18 will translate into movement of the regulator lever 23 in either first or second directions depending upon the direction of movement of the control lever 50. Moreover, and as will be appreciated, that portion of the push/pull cable 22 extending between the cable mounting assembly 36 and the regulator 14 acts as a solid link connection therebetween. Accordingly, pivotal movement of the foot pedal 24 will likewise result in movement of the regulator lever 23 in first or second directions depending on the direction of movement of the foot pedal 24.

The control assembly of the present invention also provides a mechanism 120 for governing operation of the regulator 14 under the influence of the foot and hand control assemblies 16 and 18, respectively. In the embodiment illustrated in FIGS. 10 and 11, the governing mechanism 120 includes a stop plate or member 122 suitably affixed to a wall or panel 123 on the implement in a stationary manner and defining a fore-and-aft elongated slot 124. Extending through the slot 124 is the regulator 23.

Figures 10, 11:
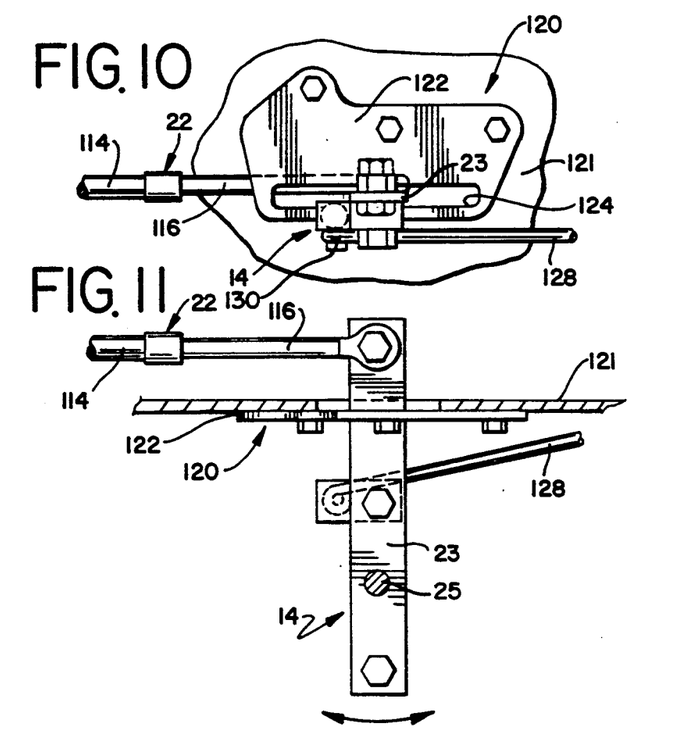
FIG. 10 is a side elevational view of one form of governing mechanism for limiting movement of the direction and speed regulator lever.
FIG. 11 is a top plan view of the governing mechanism illustrated in FIG. 10.

As shown, the regulator lever 23 pivots about the longitudinal axis of shaft 25 laterally disposed to one side of stop plate 122 and is connected to the push/pull cable 22 on an opposite side of the stop plate 122. When the regulator 14 is positioned to condition the implement for neutral operation, the regulator lever 23 is positioned about mid-length of the length of slot 124. When either the foot or handle control assemblies 16 or 18, respectively, are moved to adjust the condition of the implement, the regulator lever 23 moves toward a respective end of slot 124. As will be appreciated, slot 124 is sized to limit or govern movement of the regulator lever 23 in opposite directions from a neutral position. Governing the regulator 14 will eliminate stresses to the servovalve of the hydrostatic pump which could result from excessive movement of the regulator 14.

The control assembly of the present invention can further include a neutral switch assembly 126 which is arranged in combination with the regulator 14. The neutral switch assembly 126 is preferably of the type described and shown in U.S. Pat. No. 4,895,053 to J. M. Mofitt, the full disclosure of which is incorporated herein by reference. Suffice it to say, switch assembly 126 includes a neutral switch 126 which is suitably mounted on the implement and is capable of providing an output signal indicative of the position of the regulator 14. As shown in FIG. 1, the neutral switch assembly 126 is connected to the regulator lever 23 as through a link 128 and, thus, is responsive to position of the regulator lever 23. As shown in FIG. 10, link 128 is preferably connected to lever 23 as with a conventional ball joint 130 to readily allow the transfer of motion to switch assembly 126 and inhibit binding forces from acting thereon. In a most preferred form of the invention, the neutral switch assembly 126 inhibits starting of the implement unless the foot and hand control assemblies 16 and 18, respectively, are each in position to condition the regulator 14 in a neutral position or condition.

During operation of the implement, the foot pedal 24 of the foot control assembly 18 is normally urged toward a self-centered and neutral position under the influence of spring 34. The control lever 50 of the hand control assembly 18 can likewise be positioned in neutral by moving the lever portion 100 of the control lever 50 into the neutral recess 92 of the profiled guide 90 on housing 52.

With the foot control assembly 16 and hand control assembly 18 each in a neutral position, the regulator lever 23 will condition the implement for neutral operation. In the preferred form of the invention, the neutral position of the regulator 14 will be sensed by the neutral switch assembly 126. If either the foot control 16 or hand control 18 were in a position other than neutral, the neutral switch assembly 126 would inhibit starting of the implement.

To condition the implement in a work mode, the operator moves the control lever 50 of the hand control assembly 18 in the direction of desired operation. That is, to condition the implement for forward operation at a substantially continuous speed, the control lever 50 is moved in one direction thus causing movement of the regulator lever 23 from a neutral condition and into a desired position. To condition the implement for reverse operation at a substantially continuous speed, the control lever 50 is moved in an opposite direction thus displacing the regulator lever 23 from a neutral condition and into a desired position.

In the preferred form of the invention, control lever 50 of the hand control assembly 18 is required to move about each of the pivot axes 62 and 70 before the control lever is released from the neutral recess 92 on the profiled guide. Requiring the control lever 50 of the hand control assembly to be moved about two axes inhibits inadvertent shifting or movement of the hand control assembly from a neutral condition. As will be appreciated, pivotal movement of the control lever 50 in either direction about axis 62 of the hand control assembly 18 will result in displacement of the regulator lever 23 through the push/pull cable 22 of the force transfer means 20. Moreover, pivotal movement of the control lever 50 is limited by the stops on 94 and 96 provided on the profiled guide 90 of housing 52. Having moved the control lever 50 into a desired location, the brake mechanism 82 will inhibit inadvertent movement of the control lever 50 from the desired or set location.

In addition to positioning the regulator 14 and thereby conditioning speed and direction of the implement, the operator can selectively and readily operate the switch assembly 118 located on the grip portion 102 of control lever 50 to control auxiliary functions of the implement. With the present invention, the wires 110, 112 for the switch assembly 108 are removably arranged within the control lever 50 to provide a pleasing aesthetic effect for the hand control assembly 18.

When the operator needs to override the setting of the hand control assembly 18, as for transportation of the implement, the operator can move the foot pedal 24 in the desired direction. Pivotal movement of the foot pedal 24 is translated into movement of the cable mounting assembly 36 and thereby endwise displacement of the push/pull cable 22 in the desired direction. Notably, the cable mounting assembly 36 supports and positions the end of the push/pull cable 22 relative to the regulator 14 for all settings of the regulator lever 23 thereby inhibiting binding stresses from being imparted to the cable 22 as the regulator 14 is moved in either direction from a neutral condition. It has been found beneficial to provide a parallelogram-type linkage arrangement which allows the cable mounting plate 38 to move in an elliptical arc thereby positioning the cable 22 relative to the regulator 14 to inhibit stresses within the cable thereby providing efficient and proper operation of the force transfer means 20 for all settings of the regulator lever 23.

When the operator releases the foot pedal 24, the centering spring 34 will forcibly return the foot pedal 24 to a neutral position. Moreover, the spring 34 will act to forcibly return the regulator 14 through the force transfer mechanism 20 to the position set by the hand control assembly 18.

The governing mechanism 120 is provided in combination with the other features of the control assembly of the present invention to inhibit damage to the implement resulting from excessive movement of the regulator 14. As will be appreciated, the limit stops 94 and 96 provided on the hand control assembly 18 furthermore limit displacement of the control lever 50 and thereby limit the travel of regulator lever 23 in opposite directions from a neutral position.

In addition to individualized positioning of the regulator 14 under the influence of either the foot control assembly 16 or the hand control assembly 18, the regulator lever 23 can likewise be positioned to either side of a neutral condition as a result of a cumulative action of the foot and hand control assemblies 16 and 18, respectively. For example, assume that the hand control assembly 18 is moved to position the regulator lever 23 at or near the end of its travel within slot 124 of the governing mechanism 120. Because the foot control assembly 16 is independent from the hand control assembly 18, the operator could independently move foot pedal 24 in a direction which would cause further displacement the regulator lever 23 from a neutral position and in the direction set by the hand control assembly 18. Absent governing mechanism 120, the cumulative movement of the foot and hand control assemblies 16 and 18, respectively, could result in movement of the regulator lever 23 beyond that tolerated by the mechanism controlled thereby, i.e., the engine of the implement.

The governing mechanism 120 of the present invention limits movement of the regulator lever 23 and thereby protects against inadvertent overdisplacement of the regulator 14. Once the limit of the regulator movement has been achieved, the push/pull cable 22 will respond to the excessive movement and will forcibly return the control lever 50 of hand control assembly 18 to a neutral position. By this arrangement, the foot and hand control assemblies 16 and 18, respectively, can combine with other to cumulatively move or position the regulator 14 in either direction from a neutral position with assurance that the governing mechanism 120 inhibits damage to the implement as a result of excessive movement of the regulator lever 23.

Another important aspect of the present invention concerns the low effort required to move the control lever 50 of the hand control assembly 18 to position the regulator lever 23. The low level of operator effort results primarily from isolating the hand control assembly 18 from the self-centering mechanism used to return the foot pedal 24 of the foot control assembly 16 to a neutral position after the operator lifts his foot from the pedal. That is, isolating the hand control assembly 18 from the spring action of the foot control assembly 16 means that the control lever 50 is free to move the push/pull cable 22 and is not required to overcome the forces imparted by spring 34 to the foot control assembly.

As will be appreciated, the present invention provides a simple, low-cost and efficient arrangement for combining hand and foot controls in conditioning speed and direction of an implement. Moreover, due to the flexibility of the push/pull cable 22, the present invention is particularly easy to install in a variety of implement configurations since the push/pull cable can easily be arranged between the foot and hand control assemblies 16 and 18, respectively.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A control system for an off-highway implement, comprising:

movable regulator means operably movable to either side of a neutral position for influencing implement operation as a function of the position thereof;

hand control means for selectively moving said regulator means into position to condition the implement for operation and comprising a pivotal hand control connected to said regulator means through motion transmitting means including an elongated flexible conduit having a first end secured against movement and a second end with an elongated flexible motion transmitting core element movably supported by said conduit and whose ends extend beyond said ends of the conduit, a first end of said core element being connected to aid hand control and a second end being connected to said regulator means whereby pivotal movement of said hand control translates into movement of said regulator means; and foot control means for selectively moving said regulator means into position to condition the implement for operation independently of said hand control means, said foot control means including a positionable foot pedal connected through said motion transmitting means to said regulator means and means for connecting said foot pedal to said flexible conduit of said motion transmitting means, said connecting means including linkage means for supporting and positioning the second end of said flexible conduit relative to said regulator means for all settings thereof thereby inhibiting binding stresses between said core element and said flexible conduit of said motion transmitting means as said regulator means is moved through a range of positions.

2. The control system according to claim 1 further including a neutral switch assembly connected to said regulator means to inhibit starting of the implement unless said hand control means and foot control means are each in a neutral position.

3. The control system according to claim 1 wherein the linkage means of said connecting means comprises a mounting plate connected toward and supporting the second end of said flexible conduit, said mounting plate being mounted for swinging movement in an elliptical arc by a parallel linkage mechanism.

4. A control system for an off-highway implement, comprising:

movable regulator means including a regulator lever for influencing implement operation as a function of the position of said regulator lever;

hand control means for selectively moving said regulator means into position to condition the implement for operation and comprising a pivotal hand control connected to said regulator lever through motion transmitting means including an elongated flexible conduit having a first end secured against movement and a second end with an elongated flexible motion transmitting core element movably supported by said conduit and whose ends extend beyond said ends of the conduit, a first end of said core element being connected to said hand control and a second end being connected to said regulator means whereby pivotal movement of said hand control translates into movement of said regulator lever between a neutral position and opposite sides of a neutral position; and foot control means for selectively moving said regulator lever between a neutral position and opposite sides of a neutral position to condition the implement for operation independently of said hand control means, said foot control means including a positionable foot pedal connected through said motion transmitting means to said regulator means and means for connecting said foot pedal to said flexible conduit of said motion transmitting means, said connecting means including linkage means for supporting and positioning the second end of said flexible conduit relative to said regulator lever for all settings thereof thereby inhibiting binding stresses between said core element and said flexible conduit of said motion transmitting means as said regulator lever is moved through a range of positions.

5. The control system according to claim 4 further including means for governing operation of said regulating means, said governing means including a fixed member defining an elongated slot through which a portion of said regulator lever extends, with opposite ends of said slot limiting movement of said regulator lever thereby governing operation of said regulator means.

6. A control system for a mobile off-highway implement comprising:

regulator means movable into different positions for conditioning the implement ground speed and direction of movement;

hand control means for selectively positioning said regulator means, said hand control means comprising a positionable hand control connected to said regulator means through motion transmitting means including a flexible conduit having a first end secured against movement and a second end, with a flexible motion transmitting core element being movably supported by said conduit and whose ends extend beyond said ends of the conduit, a first end of said core element being connected to said handle control and a second end being connected to said regulator means whereby movement of said hand control translates into movement of said regulator means thereby conditioning the implement for operation; and foot control means including a self-centering foot pedal connected to said motion transmitting means toward a second end of said flexible conduit for selectively positioning said regulator means independently of said hand control means thereby conditioning the implement for operation.

7. The control system according to claim 6 further including governing means for limiting movement of said regulator means thereby inhibiting damage to the implement through excessive movement of the regulator means resulting from a cumulative action under the influence of said hand and foot control means.

8. The control system according to claim 6 further including means responsive to movement of said regulator means for inhibiting starting of the implement unless said hand control and foot control means are each in neutral positions.

9. The control system according to claim 6 further including a linkage assembly for connecting said foot pedal to said motion transmitting means, said linkage assembly including a self-centering lever connected to said foot pedal and to a cable mounting plate attached toward and supporting a second end of said flexible conduit, said mounting plate being mounted for movement by a parallel linkage mechanism to position said motion transmitting means relative to said regulator means to inhibit cable binding stresses in said motion transmitting means for all settings of the regulator means.

10. The control system according to claim 6 wherein said hand control includes selectively operable electrical switch means for controlling auxiliary functions for the implement.

11. A control system for a mobile off-highway implement comprising:

positionable regulator means for controlling implement ground speed and direction as a function of the position of a regulator lever relative to a neutral position;

foot control means for selectively moving said regulator lever in first and second opposite directions away from the neutral position of said regulator means, said foot control means comprising a self-centered foot pedal connected to said regulator means through a cable and a linkage assembly, the linkage assembly including a mounting plate mounted for swinging movement in an elliptical arc by a parallel linkage mechanism and connected to and supporting said cable relative to said regulator lever through a full range of travel of said regulator means thereby inhibiting cable binding stresses from being imparted to said cable for all settings of said regulator means.

12. The control system according to claim 11 wherein said foot control means includes a spring operated self-centered lever arranged between and connected to said foot pedal and said mounting plate.

13. A ground speed and direction control system for a mobile off-highway implement comprising:

positionable regulator means for conditioning the ground speed and direction of implement operation as a function of the position of said regulator means relative to a neutral position;

foot control means for selectively moving said regulator means in first and second opposite directions, said foot control means comprising a foot pedal mounted for movement in first and second opposite directions, self-centering linkage means connected to said foot pedal and through motion transmitting means to said regulator means whereby movement of said foot pedal moves said regulator means, said motion transmitting means including an elongated flexible conduit secured to and movably supported at a first end by said self-centered linkage and having a flexible motion transmitting core element movably supported by said conduit and whose ends extend beyond said first end and a fixedly secured second end of said conduit, with one end of said motion transmitting core element connected to said regulator means; and hand control means for selectively moving said regulator means in said first and second opposite directions independently of said foot control means, said hand control means comprising a movable hand controller connected to another end of said flexible motion transmitting core element and isolated from the self-centering linkage of said foot control means to facilitate selective movement of said hand controller independently of said foot control means thereby positioning the regulator means.

14. The control system according to claim 13 wherein said hand controller is pivotally movable to either side of a neutral position about a fixed pivot axis.

15. The control system according to claim 14 wherein said self-centering linkage means is adapted to automatically return said foot pedal to a neutral position upon removal of forces acting thereon while allowing said regulator means to remain in a metered speed position as determined by the position of said hand controller to either side of said neutral position.

16. The control system according to claim 13 wherein said motion transmitting means comprises a push/pull cable, with said self-centering linkage including a cable mounting plate secured to said cable and suspended by a parallel linkage arrangement for movement in a manner inhibiting cable binding stresses for all settings of the regulator means.

* * * * *